US009049875B2

(12) United States Patent
Ewald et al.

(10) Patent No.: US 9,049,875 B2
(45) Date of Patent: Jun. 9, 2015

(54) STEAM AND PLATEN TOASTING DEVICE (75) Inventors: Henry T. Ewald, Roselle, IL (US); Paul G. Simmons, Glen Ellyn, IL (US)

(73) Assignee: Restaurant Technology, Inc., Oak Brook, IL (US)

(*) Notice: Subject to any disclaimer, the term of this patent is extended or adjusted under 35 U.S.C. 154(b) by 688 days.

(21) Appl. No.: 12/798,926

(22) Filed: Apr. 14, 2010

(65) Prior Publication Data

US 2011/0256286 A1    Oct. 20, 2011

(51) Int. Cl.
  A47J 37/07   (2006.01)
  A23L 1/01    (2006.01)
  A47J 37/08   (2006.01)

(52) U.S. Cl.
  CPC ............ A23L 1/0121 (2013.01); A23L 1/0128 (2013.01); A47J 37/0857 (2013.01)

(58) Field of Classification Search
  USPC .......... 99/325–332, 339, 340, 357, 352, 355, 99/386, 387, 401, 444–446, 443 C, 448, 99/467, 468, 469, 473–476, 480, 483, 516, 99/534, 536; 126/20, 20.1, 20.2, 21 A, 126/369, 369.1, 369.2; 219/385, 386, 401, 219/444, 442, 521; 426/456, 510, 523
  See application file for complete search history.

(56) References Cited

U.S. PATENT DOCUMENTS

| 1,538,864 | A |   | 5/1925 | Morrison |
| 1,828,542 | A | * | 10/1931 | Padelford ...................... 426/458 |
| 2,051,303 | A |   | 8/1936 | Leichter |
| 2,225,068 | A |   | 12/1940 | Marriott |
| 3,456,578 | A |   | 7/1969 | Pinsly |
| 3,659,518 | A |   | 5/1972 | Porter |
| 4,179,985 | A |   | 12/1979 | Baker et al. |
| 4,577,550 | A | * | 3/1986 | Maroti et al. ............. 99/329 RT |
| 5,680,810 | A |   | 10/1997 | Sham |
| 5,800,853 | A | * | 9/1998 | Wang ........................... 426/511 |
| 5,931,083 | A |   | 8/1999 | Stanger et al. |
| 6,100,502 | A |   | 8/2000 | Sham et al. |
| 6,177,654 | B1 | * | 1/2001 | Schackmuth ................. 219/388 |
| 2002/0029698 | A1 | * | 3/2002 | van de Vorst et al. .......... 99/477 |
| 2002/0112615 | A1 |   | 8/2002 | Hashimoto et al. |
| 2003/0037682 | A1 | * | 2/2003 | Dzbinski ...................... 99/422 |
| 2004/0083900 | A1 | * | 5/2004 | Rousseau ...................... 99/385 |
| 2004/0208961 | A1 |   | 10/2004 | Reckert et al. |
| 2005/0155495 | A1 | * | 7/2005 | Nevarez ........................ 99/385 |
| 2006/0243721 | A1 |   | 11/2006 | Sorensen et al. |
| 2008/0032018 | A1 | * | 2/2008 | Garniss et al. ................ 426/523 |

FOREIGN PATENT DOCUMENTS

GB      2308291 A  *  6/1997  ............. A47J 37/08

OTHER PUBLICATIONS

International Searching Authority, International Search Report and Written Opinion, International Application No. PCT/US2011/00648, Jun. 15, 2011.

* cited by examiner

Primary Examiner — Thien S Tran
(74) Attorney, Agent, or Firm — Hinshaw & Culbertson LLP

(57) ABSTRACT

In accordance with the invention, a device and method for steaming and toasting food items is provided. The device is particularly suited for steaming and toasting hamburger sandwich bun heels and crowns. The device in accordance with the invention may include a steam outlet for steaming food items by impinging steam onto the food item. A conveyor moves the food item along a toasting pathway in which the food item is toasted by a heated platen extending along at least a portion of the toasting pathway.

20 Claims, 7 Drawing Sheets

STEAM AND PLATEN TOASTING DEVICE

FIELD OF THE INVENTION

The present invention relates to cooking devices and methods. More particularly, the present invention relates to a toasting device that also injects steam into the food item.

BACKGROUND OF THE INVENTION

Conveyorized toasting devices can be used in high-volume cooking applications for in-line toasting of food items. Typically, a toasting device is composed of a chamber having an inlet for receiving a food item, a heated platen, a conveyor for conveying the food item along a toasting pathway adjacent the heated platen, and an outlet for discharging the toasted food item. When the food items toasted are hamburger buns, the toasting device commonly has an inlet on each side of the heated platen for separately receiving a bun crown and bun heel (collectively, "bun"). The inside, cut faces of the bun crown and heel may be simultaneously toasted along conveyorized toasting pathways on opposite sides of the platen.

Toasting buns with current conveyorized toasting devices has been known to deform the shape of the buns, causing "cupping" of the toasted cut surfaces of the bun crown and heel. Moreover, current devices have a limited capacity to quickly toast a bun and produce quality results. For example, raising the platen temperature reduces the time required for a bun to reach a desired temperature, but the platen temperature must not be high enough to burn the surface of the bun. A need therefore exists for a high-volume toasting device that provides fast, quality toasting of a cut bread surface and which reduces or eliminates cupping.

BRIEF SUMMARY OF THE INVENTION

In accordance with one aspect of the present invention, a device for steaming and then toasting food items is provided. The device includes a food inlet for receiving food items and a food outlet for discharging food items after steaming and toasting. A steam outlet is located between the food inlet and the food outlet, for steaming food items by impinging steam onto a food item, with a space being located adjacent the steam outlet for allowing a food item to be positioned adjacent the steam outlet. A heated platen is provided for toasting food items along a toasting pathway. A conveyor is located at least between the steam outlet and the food outlet, the conveyor for conveying along the toasting pathway and for permitting toasting while conveying a food item after steaming. The device in accordance with the invention may be configured particularly for the steaming and toasting of buns, such as hamburger sandwich buns.

In accordance with another embodiment, the device for steaming and toasting food items may further include a food item steaming pathway that is located upstream of the toasting pathway. The toasting pathway may have an entrance and the steaming pathway can terminate adjacent the entrance to the toasting pathway. In one embodiment, the steam outlet may be a narrow slit having a width perpendicular to the steaming pathway and the width may be approximately equal to the maximum width of the food item to be steamed and a substantially uniform height parallel to the steaming pathway.

In accordance with another embodiment of the invention, the steam outlet may have an opening that is approximately the same area and shape as a face of the food item to be steamed. The device in accordance with the invention may further include a food item retention assembly generally adjacent the steam opening. The food item retention assembly may include a support member that is at least generally parallel to the steam outlet, a food item release hatch hingedly attached to the support member remote from the food inlet, the support member and the release hatch being adapted to retain a desired portion, typically a face, of the food item in substantial alignment with the steam outlet when the release hatch is in a closed position at least generally perpendicular to the support member. A release hatch trip mechanism is provided that is tripped when a food item is inserted into the food item retention assembly, causing the release hatch to swing or otherwise move into an open position aligned with the support member that is at least generally aligned with the support member after the predetermined steaming time has elapsed. In this manner, the food item is allowed to drop down and out of the food item retention assembly and into engagement with the conveyor. In one embodiment, the release hatch automatically swings or otherwise moves back into the closed position once the food item is clear of the release hatch and typically also clear of the bottom of the food item retention assembly.

In accordance with another aspect of the present invention, an automatic food item feeder is part of the steaming and toasting device of the present invention. The feeder typically will have a housing and a feeder coil located within the housing. The feeder coil is mounted for rotatable movement and is adapted to hold a plurality of food items and feed the food items into the food inlet one food item at a time when rotated. Typically, the steam outlet, the heated platen, the conveyor and the axis of rotation of the feeder coil are oriented generally horizontally. The steaming and toasting device in accordance with the present invention may further include an inlet chute located between the discharge of the feeder coil and the food inlet. Typically, the inlet chute will have a top and a bottom with the top of the inlet chute adjacent the outlet of the feeder coil and the bottom of the inlet chute will be located adjacent the food inlet. The inlet chute is adapted to receive a vertically oriented food item, such as a hamburger bun crown or heel, for example, from the feeder coil to direct the food item into the food inlet oriented in at least a generally horizontal position.

In accordance with another aspect of the invention, a method of steaming and toasting a food item is provided. The method in accordance with the invention includes providing a steaming and toasting device as previously described herein. Thereafter, a food item is introduced into the device and placed into a position for steaming which may include introducing a food item into the steam injection device or alternatively introducing a food item so that it is adjacent the steam outlet. Thereafter, steam is injected into or impinged upon the food item by steam exiting the steam outlet to steam the food item. The steamed food item is then discharged from the steam injection device or otherwise transported from a position adjacent the steam outlet and introduced into the toasting portion of the steam and toasting device of the invention. The steamed food item is then toasted as it is conveyed along the toasting pathway and thereafter the steamed and toasted food item is discharged from the toasting device.

DETAILED DESCRIPTION OF THE INVENTION

Figure 1:
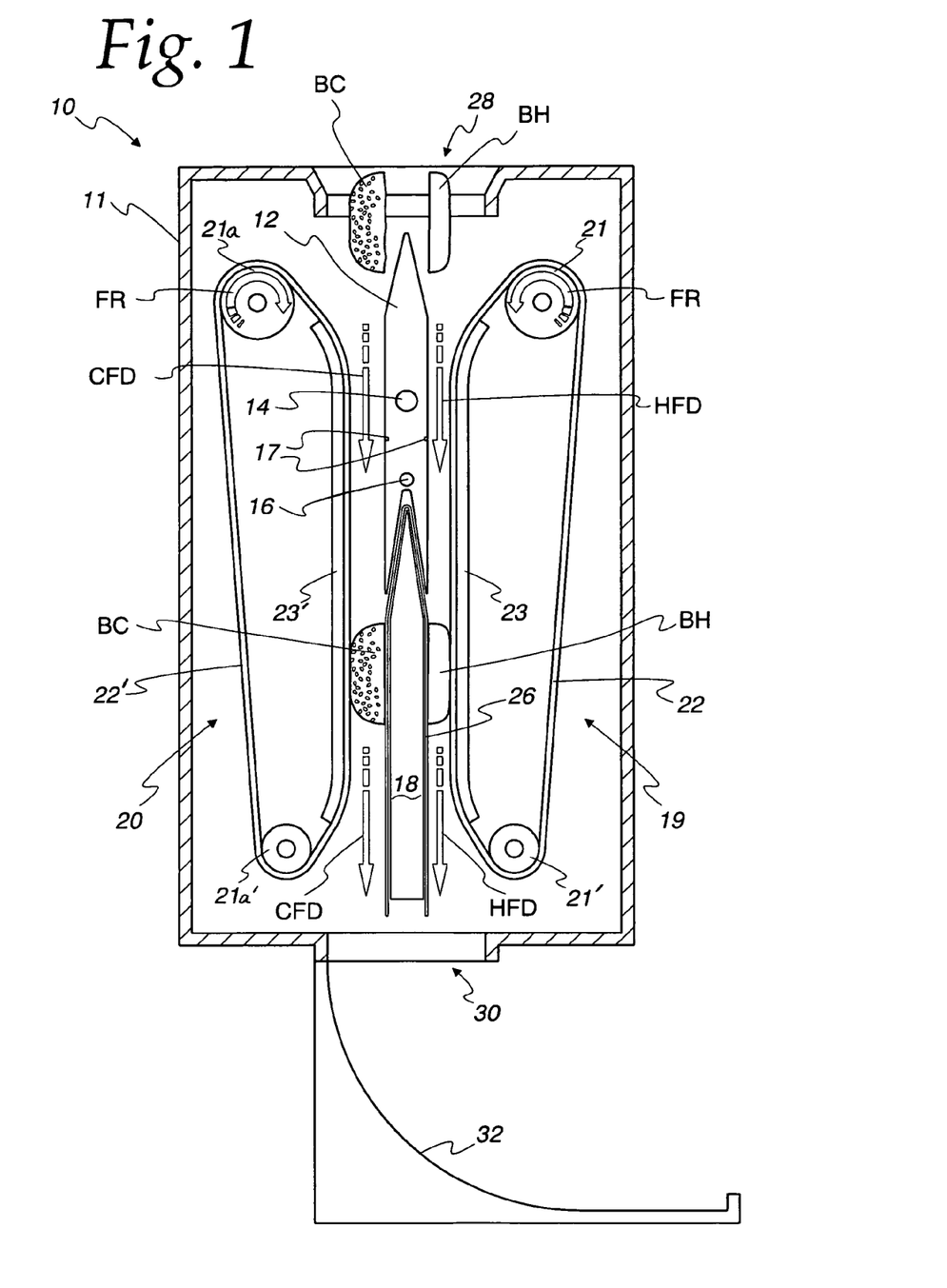
FIG. 1 is a side elevation sectional view of a vertical steaming and toasting device in accordance with the present invention.
Figure 2:
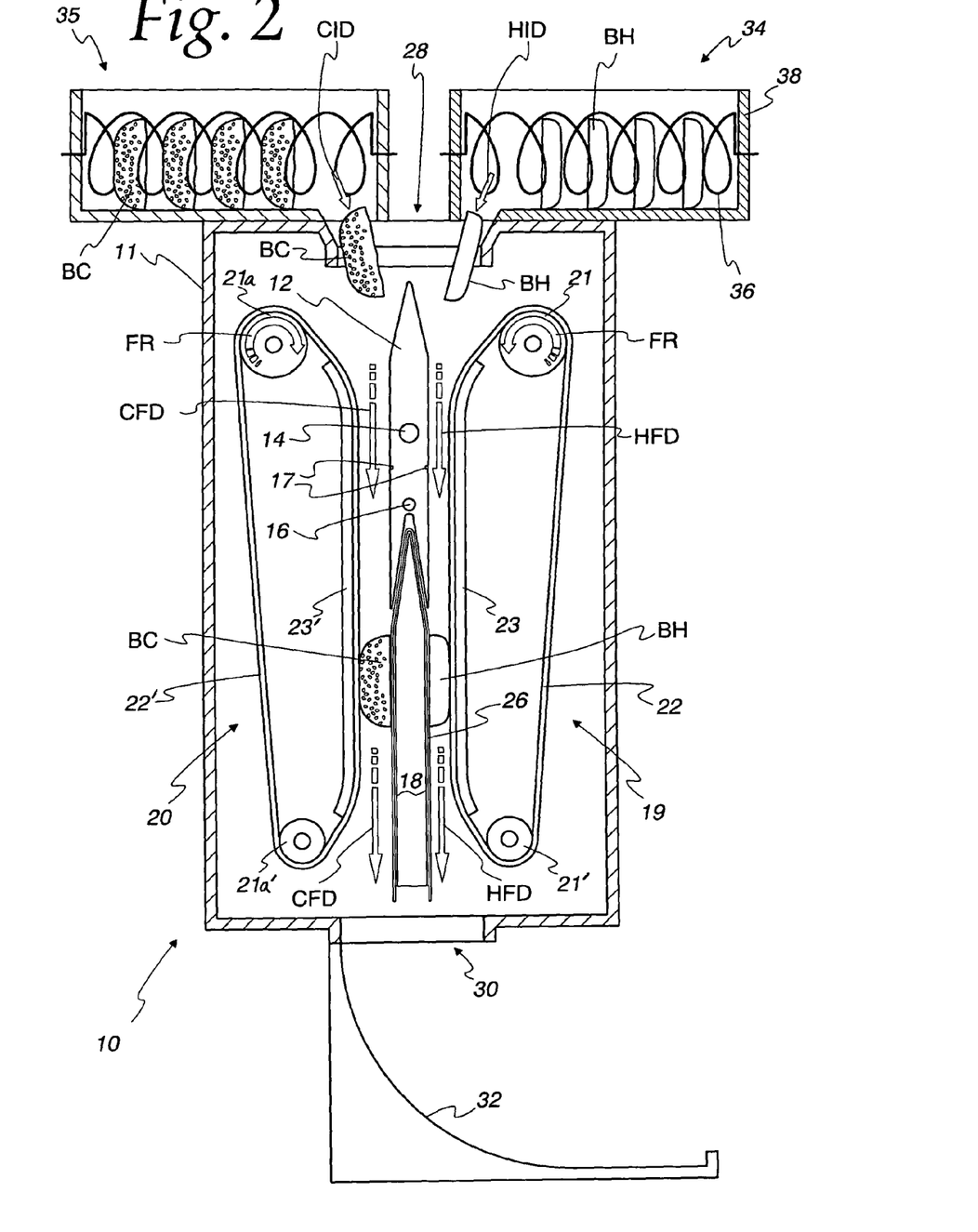
FIG. 2 is a side elevation sectional view of a vertical steaming and toasting device with automatic bun heel and crown feeders.
Figure 3:
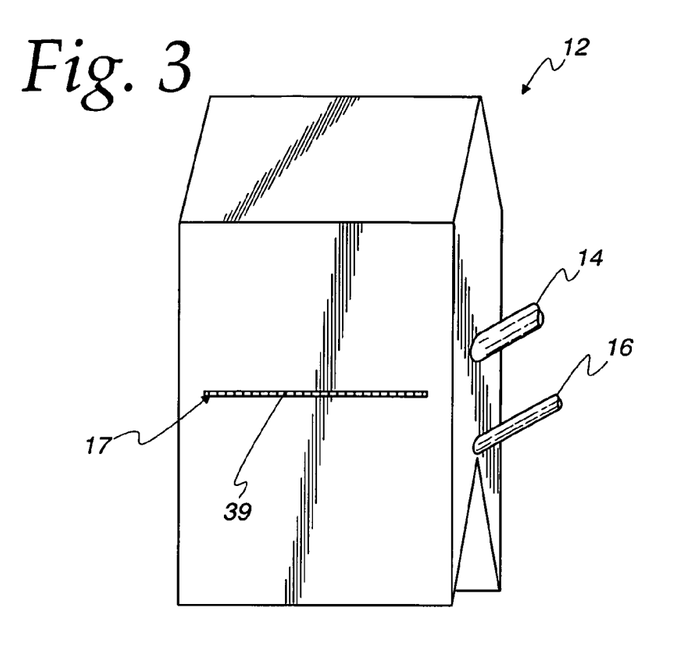
FIG. 3 is a perspective view of a steamer device forming part of the steaming and toasting device of FIG. 1.
Figure 4:
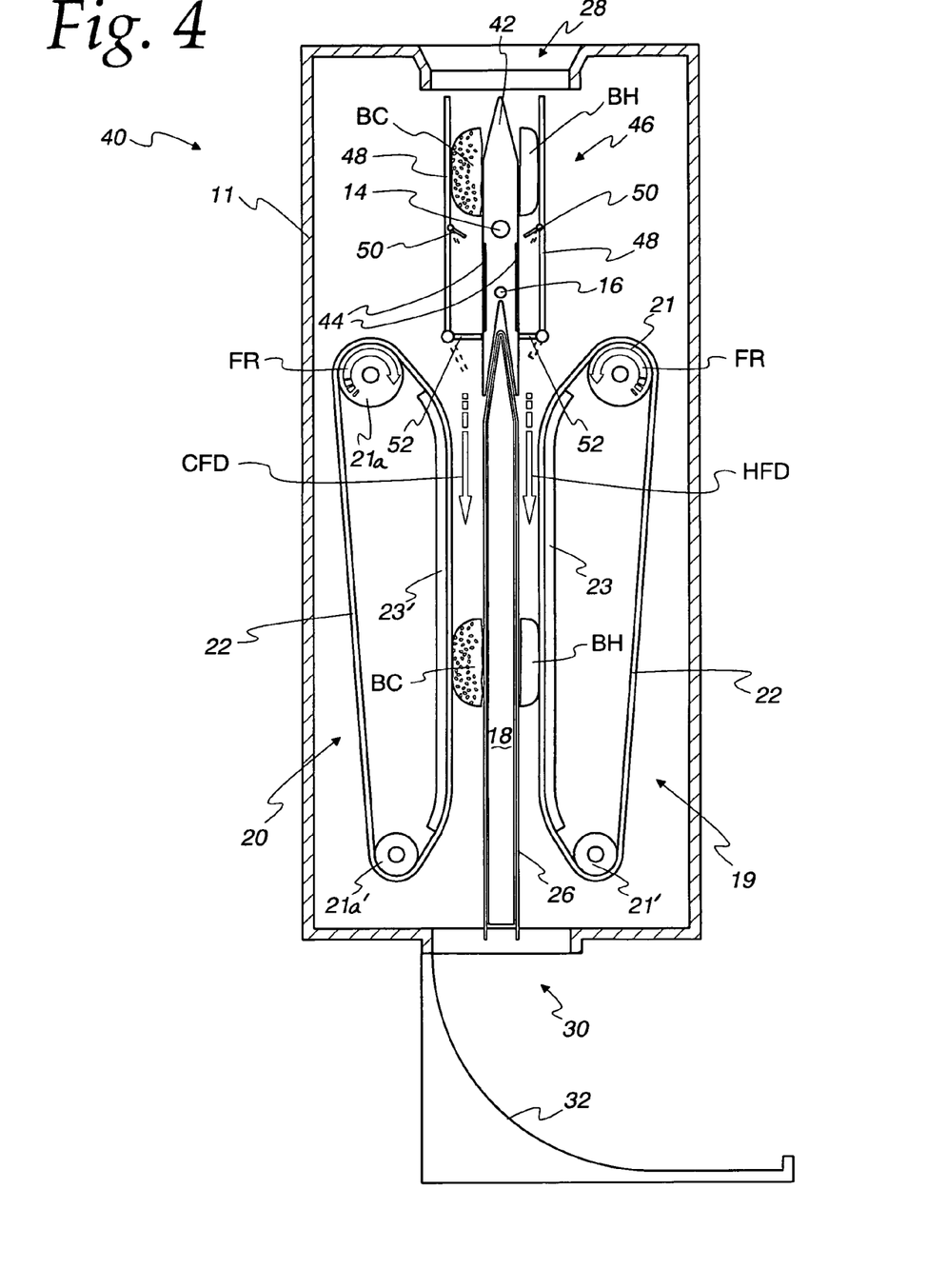
FIG. 4 is a side elevation sectional view of an alternate embodiment vertical steaming and toasting device in accordance with the present invention, with one wall of the housing cut away to reveal the inside of the device.
Figure 5:
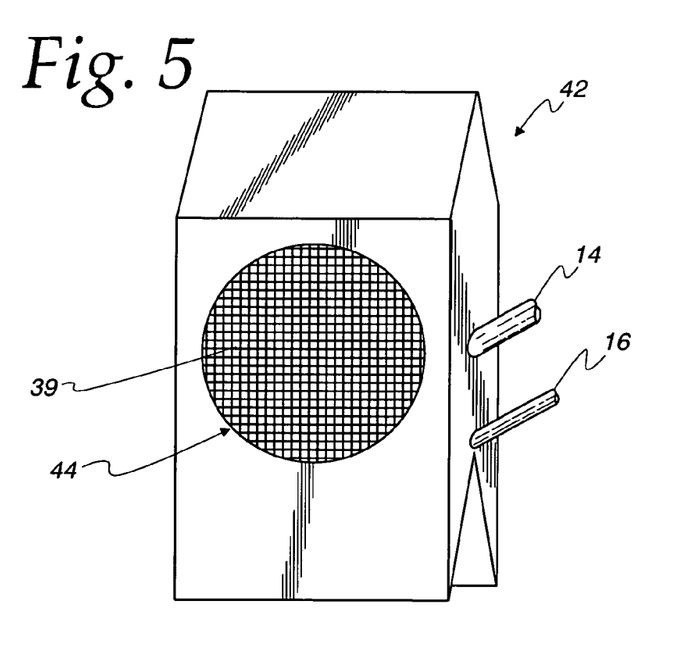
FIG. 5 is a perspective view of a steamer device forming part of the steaming and toasting device of FIG. 4.

Improved steam toaster devices for faster and better quality toasting are disclosed in accordance with the invention. In particular, a vertical steaming and toasting device 10 with in-motion steaming is illustrated in FIGS. 1-3, a vertical steaming and toasting device 40 with stationary steaming is illustrated in FIGS. 4 and 5, and a horizontal steaming and toasting device 54 with in-motion steaming is illustrated in FIGS. 6-9, all in accordance with the various embodiments of the present invention. In accordance with the invention, devices 10, 40 and 54 are each capable of steaming the buns just prior to commencement of bun toasting. Steaming of the buns just prior to toasting provides a number of significant advantages. The significant advantages include: a refreshing of the bun surface (this is important for buns that are not utilized immediately upon receipt from the bakery), providing a more moist and tender bun after toasting (the amount of moisture prior to steaming and toasting can be essentially the same as the amount of moisture after toasting in accordance with the invention), steaming causes a preheating of the bun surface just prior to toasting thereby reducing the toasting time and reduces or prevents "cupping" of the bun as a result of toasting. As buns age, they lose moisture prior to toasting and thus lose weight prior to toasting. Steaming the buns just prior to toasting results in a weight gain which it is believed is dependent on the age or moisture loss of the buns prior to steaming. Consequently, it is believed that typically, the older the bun the higher the weight gain as a result of steaming. Typically, toasting a standard hamburger bun without steaming reduces the bun weight from about 1.3 to 1.6 percent. The combination of steaming and toasting in accordance with the invention typically results in a bun weight increase of from about 0.5 to about 1.5 percent, resulting in a net difference in bun weight of from about 1.8 to about 3.1 percent. Also, the steam toasted buns have a higher temperature immediately after toasting to the desired degree. Typical temperature differences are from about 10° F. to about 20° F. warmer for steam toasted buns compared to regular toasted buns (no steaming). In addition, a toasting time of about 13 seconds can be achieved compared to a current best toasting time of about 17 seconds for conveyor toasters that do not presteam buns.

Referring to FIG. 1, vertical steaming and toasting device 10 for in-motion steaming and toasting of hamburger buns is shown, encased in a housing 11 with one wall cut away to reveal the inside of the device. Vertical steaming and toasting device 10 has an in-motion vertical steamer 12, steamer 12 composed of a steam inlet 14, a condensate outlet 16, and steam outlets 17; and a central heated platen 18. Steamer 12 may have a single pair of opposed steam outlets 17, as shown in the Figures, or more than one pair. A heel conveyor 19 and a crown conveyor 20 are adapted to convey hamburger bun heels BH and crowns BC in a heel feed direction HFD and a crown feed direction CFD, respectively, past steamer 12 and then platen 18, for steaming and then toasting of their cut faces. Conveyors 19 and 20 are composed of rollers 21, 21', 21a and 21a', belts 22 and 22', and tensioner assemblies 23 and 23'. Rollers 21 and 21a are driven or otherwise rotate in the food rotation direction indicated by arrows FR in FIGS. 1, 2 and 4. Tensioner assemblies 23 and 23' may be adjustable to provide a desired tension on belts 22 and 22', respectively, and a desired compression of bun halves BH and BC against central platen 18, to achieve intimate heat transfer contact. A non-stick cooking sheet 26 may be draped over both sides of central platen 18 as shown, to provide a low-friction interface between the bun halves and central platen 18. Bun halves to be steamed and toasted may be inserted into vertical steaming and toasting device 10 through a food inlet 28, and steamed and toasted bun halves may be discharged through a food outlet 30 into a discharge chute 32.

In FIG. 2, an alternative embodiment of vertical steaming and toasting device 10 is shown, incorporating automatic bun heel and crown feeders 34 and 35, respectively. Feeders 34 and 35 are each composed of a feeder coil 36 encased in a housing 38. Feeder coils 36 may be loaded with a plurality of bun heels BH and bun crowns BC, such that one bun heel and one bun crown are dispensed with each full rotation of the feeder coils as illustrated, causing the bun halves to enter food inlet 28 in a crown infeed direction CID and a heel infeed direction HID, respectively, and to engage conveyors 19 and 20, where they are steamed and toasted as described with reference to FIG. 1. Feeders 34 and 35 improve the efficiency of vertical steaming and toasting device 10 by allowing a human operator to tend to other tasks while a plurality of bun halves are automatically fed into vertical steaming and toasting device 10. Advantageously for a high-volume food service application, the human operator may load feeders 34 and 35 with a plurality of bun halves during a "down" time, thus eliminating the need to manually feed bun halves into vertical steaming and toasting device 10 one at a time during periods of busier operation when other tasks may be pressing.

Referring to FIG. 3, in-motion vertical steamer 12 is shown in perspective view. In some embodiments of the present invention, such as those illustrated in FIGS. 1 and 2, steam is directed through steam outlets 17 into the cut faces of the bun halves while the bun halves are in motion. Thus, the preferred shape of steam outlets 17 is a horizontal slit of uniform height, as shown in FIG. 3, to assure even distribution of steam across the width of the cut faces. Steam outlets 17 are preferably covered by a steam-permeable, heat resistant grid material 39 such as a silicone polyester screen or the like.

FIG. 4 is an illustration of vertical steaming and toasting device 40 with stationary steaming. Vertical steaming and toasting device 40 is similar to vertical steaming and toasting device 10, with two important differences. First, vertical steaming and toasting device 40 has a stationary vertical steamer 42 with round steam outlets 44, as shown in FIG. 5, a perspective view of steamer 42. Steam outlets 44 are substantially the same size as the cut face of a bun half, so that they may evenly steam a stationary bun half. Second, vertical steaming and toasting device 40 additionally has a bun retention assembly 46, adapted to retain the cut face of a bun half in alignment with steam outlets 44. Bun retention assembly 46 is composed of vertical bun support members 48, trip mechanisms 50, and bun release hatches 52. When a bun heel and crown are inserted into food inlet 28, the bun halves trip trip mechanisms 50, signaling steam outlets 44 to open and inject steam into the cut faces F. After a predetermined period of time, bun release hatches 52 automatically open, dropping the bun halves into engagement with heel conveyor 19 and crown conveyor 20, respectively. The bun halves are next conveyed past hatches 52, which hatches 52 then automatically close, allowing the next bun to be inserted.

Figure 6:
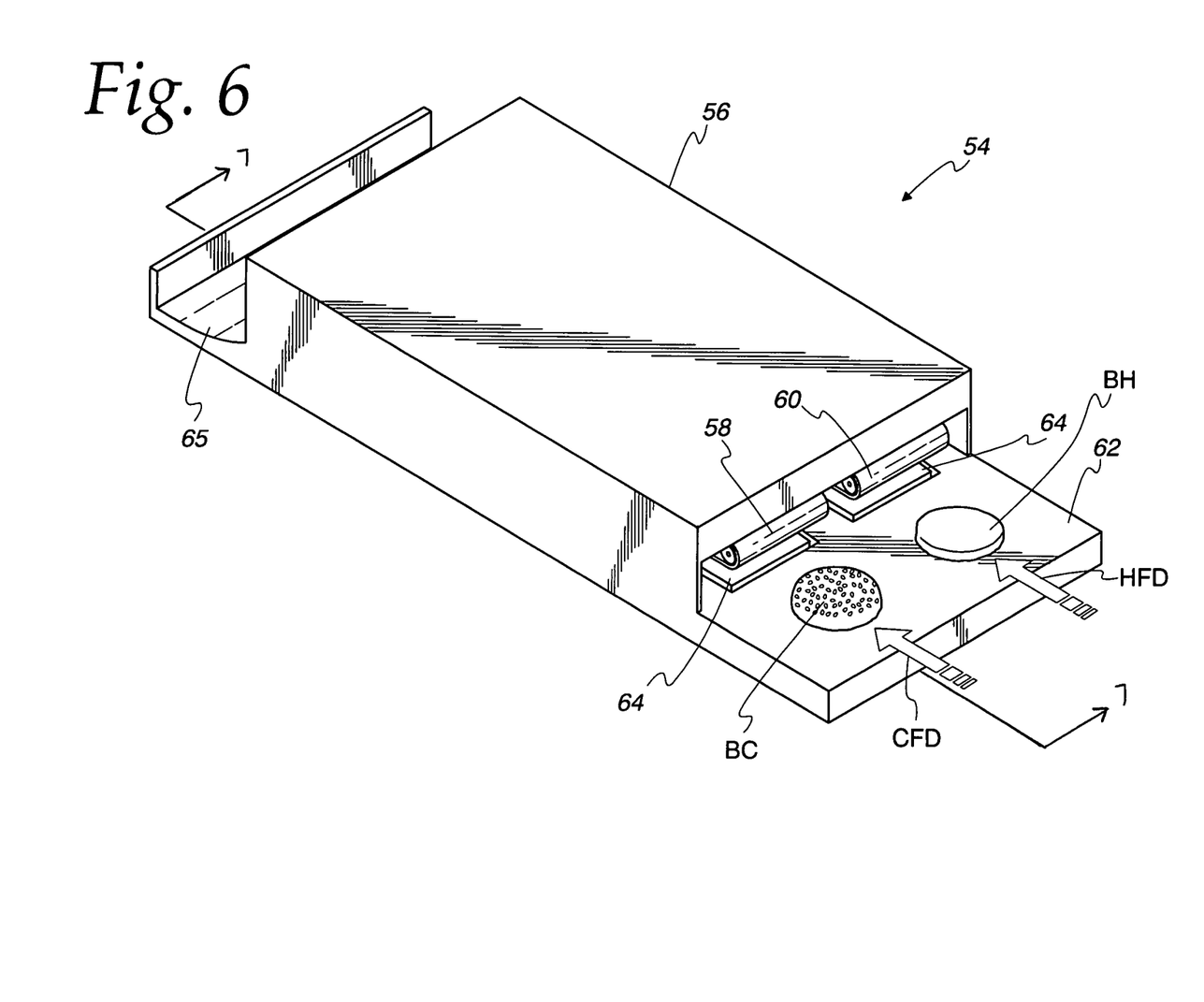
FIG. 6 is a perspective view of a horizontal steaming and toasting device in accordance with another embodiment of the present invention.
Figure 7:
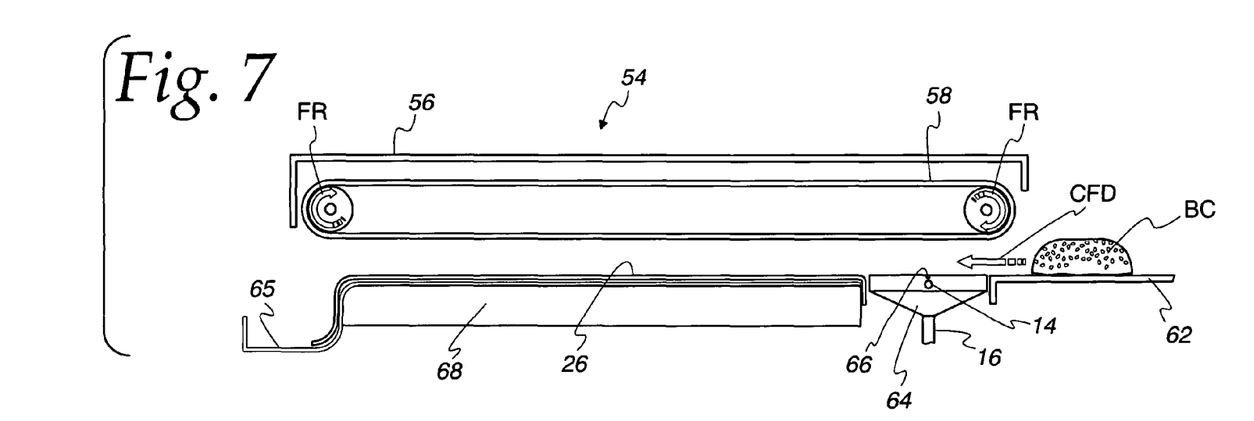
FIG. 7 is a side elevation sectional view of the horizontal steaming and toasting device of FIG. 6.

Turning to FIG. 6, horizontal steaming and toasting device 54 enclosed in a housing 56 is shown in perspective view. In the embodiment illustrated in FIG. 6, a human operator may feed a bun crown BC and bun heel BH into horizontal steaming and toasting device 54 by placing bun halves BC and BH on a bun loading shelf 62 and sliding the bun halves forward in the feed directions indicated by arrows CFD and HFD, respectively, until the bun halves are engaged by a crown conveyor 58 and a heel conveyor 60. As illustrated schematically in FIG. 7, conveyor 58 is advanced by a roller feed rotation indicated by arrows FR to convey bun crowns BC over a horizontal steamer 64, where steam passes through a steam outlet 66 into their cut faces, and then over a horizontal heated platen 68 covered by a release sheet 26, where the cut faces of the bun crowns are toasted. Bun heels are conveyed by conveyor 60 in a similar manner, although conveyor 60 is hidden from view in FIGS. 7 and 8. Upon reaching the end of platen 68, the bun halves are conveyed out of horizontal steaming and toasting device 54 and onto a discharge chute 65.

Figure 8:
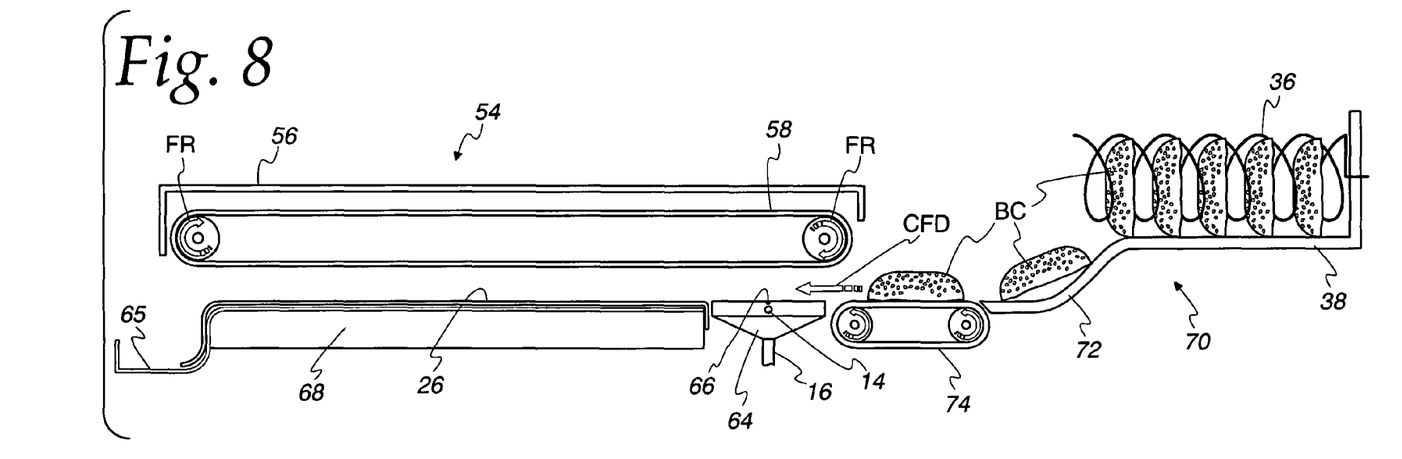
FIG. 8 is a side elevation sectional view of a horizontal steaming and toasting device similar to the view and device illustrated in FIG. 6, but with an automatic bun feeder in accordance with the invention.

In an alternative horizontal embodiment, illustrated schematically in FIG. 8, horizontal steaming and toasting device 54 incorporates an automatic bun feeding system similar to that shown in FIG. 2 for vertical steaming and toasting device 10. As shown in FIG. 8, a horizontal crown feeder 70 has a feeder coil 36 rotatably mounted to a feeder housing 38, the coil adapted to dispense bun crowns BC onto an inlet chute 72 leading to an inlet conveyor 74 which conveys the crowns into engagement with crown conveyor 58. This embodiment incorporates a similar horizontal heel feeder alongside horizontal crown feeder 70 to dispense heels onto inlet chute 72; the horizontal heel feeder is not shown in FIG. 8, however, as it is hidden behind horizontal crown feeder 70 in the side view.

Figure 9:
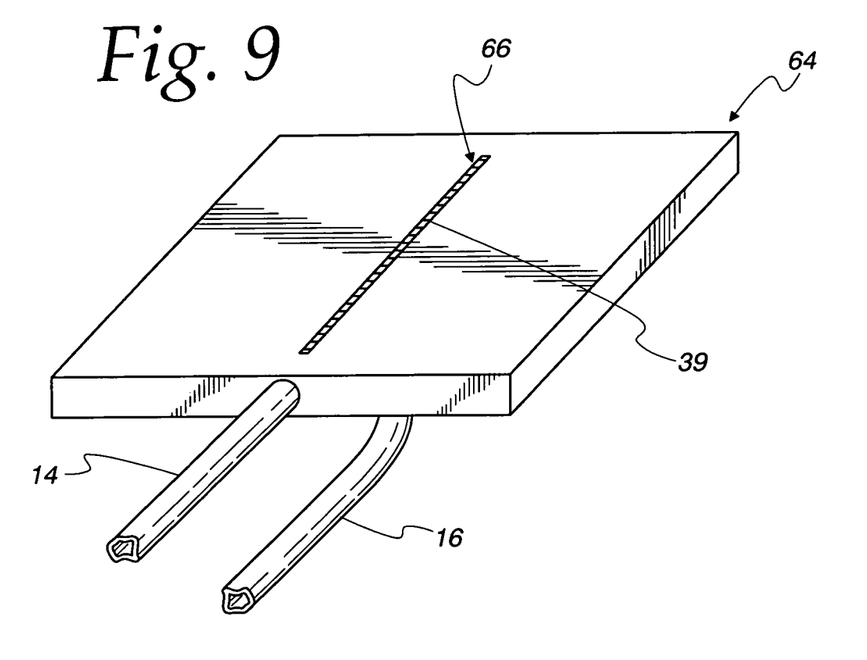
FIG. 9 is a perspective view of a horizontal steamer device forming part of the horizontal steaming and toasting devices of FIGS. 6-8.

Referring to FIG. 9, horizontal steamer 64 of horizontal steaming and toasting device 54 is illustrated in perspective view. Similarly to in-motion vertical steamer 12, horizontal steamer 64 has a steam outlet 66 in the form of a narrow slit of uniform length and a width approximately equal to the width of a bun to be steamed. Steam is provided to horizontal steamer 64 via steam inlet 14 and condensate exits steamer 64 through condensate outlet 16. In contrast to in-motion vertical steamer 12, however, horizontal steamer 64 has only one steam outlet 66, rather than a pair of steam outlets on opposing faces, thus requiring a pair of horizontal steamers 64 to simultaneously steam a bun crown and bun heel, as best illustrated in FIG. 6. However, it should be noted that a horizontal steam toaster having a single steamer with a pair of opposed steam outlets for simultaneously steaming a bun heel and crown, so as to resemble vertical steaming and toasting device 10 as shown in FIG. 1 turned on its side, is fully within the scope and spirit of the present invention.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A device for steaming and then toasting a food item having height, width, area and thickness, including such items as buns, comprising:
    a food inlet for receiving the food item and a food outlet for discharging the food item after steaming and toasting the food item;
    a steam outlet between the food inlet and the food outlet, for steaming the food item by injecting steam into the food item;
    a positioning member facing the steam outlet, disposed at a distance from the steam outlet no greater than the thickness of the food item, for positioning the food item adjacent the steam outlet;
    a heated platen for toasting the food item along a toasting pathway;
    a toasting conveyor between the steam outlet and the food outlet, the toasting conveyor configured to convey the food item along the toasting pathway in contact with the heated platen to toast the food item while conveying the food item after steaming;
    wherein the steam outlet is an opening having a width perpendicular to the steaming pathway, the width approximately equal to the maximum width of the food item to be steamed, and having a substantially uniform height parallel to the steaming pathway to provide substantially even injection of steam across the width of the food item that is steamed while the food item is moving along the steaming pathway.

2. The cooking apparatus of claim 1, further comprising a food item steaming pathway located upstream of the toasting pathway.

3. The cooking apparatus of claim 2, wherein the toasting pathway has an entrance and the steaming pathway terminates adjacent the toasting pathway entrance.

4. The cooking apparatus of claim 2, further comprising a conveyor to convey the food item along the steaming pathway.

5. A device for steaming and then toasting a food item having height, width, area and thickness, including such items as buns, comprising:
    a food inlet for receiving the food item and a food outlet for discharging the food item after steaming and toasting;
    a steam outlet between the food inlet and the food outlet, for steaming the food item by injecting steam into the food item;
    a positioning member facing and disposed at least generally parallel to the steam outlet, at a distance from the steam outlet no greater than a thickness of the food item, for positioning a food item adjacent the steam outlet;
    a heated platen for toasting the food item along a toasting pathway;
    a conveyor between the steam outlet and the food outlet, the conveyor for conveying the food item along the toasting pathway in contact with the heated platen for toasting the food item while conveying the food item after steaming,
    wherein the steam outlet is an opening having approximately the same area and shape as a face of the food item to be steamed, further comprising a food item retention assembly generally adjacent the steam opening, the food item retention assembly comprising
    a support member at least generally parallel to the steam outlet, at a distance from the steam outlet no greater than the thickness of the food item, for positioning the food item adjacent the steam outlet;

a food item release member hingedly attached to the support member remote from the food inlet, the support member and release member adapted to retain the face of the food item in substantial alignment with the steam outlet when the release member is in a closed position blocking a generally downward path of the food item toward the toasting pathway, to provide substantially even distribution of steam across the face of the food item to be steamed; and a trip mechanism for the release member that is actuated when a food item is inserted into the food item retention assembly, causing the release member to move into an open position clear of the generally downward path of the food item after a predetermined steaming time has elapsed, to permit the food item to drop down and out of the food item retention assembly and into engagement with the conveyor, the release member automatically moves back into the closed position once the food item is clear of the release hatch.

6. The cooking apparatus of claim 1, further comprising an automatic food item feeder, the feeder having a housing and a feeder coil within the housing and mounted for rotatable movement, the feeder coil adapted to hold a plurality of food items and feed the food items into the food inlet one food item at a time when rotated.

7. The cooking apparatus of claim 6, wherein the steam outlet, the heated platen, the conveyor, and the axis of rotation of the feeder coil are oriented at least generally horizontally, further comprising
an inlet chute having a top and a bottom, the top of the inlet chute adjacent the feeder coil and the bottom of the inlet chute adjacent the food inlet, the inlet chute adapted to receive a vertically oriented food item from the feeder coil and direct the food item into the food inlet oriented at least generally horizontally.

8. The device of claim 1, further comprising a steam-permeable, heat resistant grid material disposed over the steam outlet.

9. The device of claim 8, wherein the grid comprises a silicone polyester screen.

10. The device of claim 1, the positioning member being disposed at a distance from the steam outlet less than the thickness of the food item, for compressing the food item against the steam outlet.

11. The device of claim 5, the trip mechanism, when actuated, signaling the steam outlets to open and inject steam into the food item during said steaming time.

12. A method of steaming and toasting a food item having height, width, area and thickness, including such items as buns, using a steaming and toasting device comprising a food inlet and a food outlet, a steam outlet between the food inlet and the food outlet, a positioning member facing the steam outlet, disposed at a distance from the steam outlet, a heated toasting platen extending along a toasting pathway, and a conveyor between the steam outlet and the food outlet; wherein the steam outlet is an opening having approximately the same area and shape as a face of the food item to be steamed, a food item retention assembly generally adjacent the steam opening, the food item retention assembly comprising a support member at least generally parallel to the steam outlet, and a steamed food item release member, the method comprising:

inserting the food item into the food inlet;

positioning the food item adjacent the steam outlet using the positioning member;

retaining a face of the food item in substantial alignment with the steam outlet blocking a generally downward path of the food item toward the toasting pathway, to provide substantially even distribution of steam across the face of the food item to be steamed using the release member in a closed position;

injecting steam from the steam outlet into the face of the food item aligned with the steam outlet to steam the food item;

automatically moving the release member to an open position clear of the generally downward path of the steamed food item after a predetermined steaming time has elapsed to permit the steamed food item to move out of the food item retention assembly and into engagement with the conveyor; and automatically moving the release member to the closed position after the steamed food item is downstream of the release member;

using the conveyor to convey the steamed food item released from the retention assembly along the toasting pathway in contact with the heated platen to toast the steamed food item; and discharging the steamed and toasted food item from the food outlet.

13. The method of claim 12, wherein said automatically moving the release member to the open position and said automatically moving the release member back to the closed position comprises using the food item to actuate a release member trip mechanism when the food item is inserted into the food item retention assembly.

14. The device of claim 1 wherein the steam outlet is located above the toasting conveyor.

15. The device of claim 1 wherein the toasting conveyor includes a portion to convey the food item adjacent the steam outlet.

16. The device of claim 1 wherein the steam outlet is configured as a slit.

17. The device of claim 1 wherein the toasting pathway is generally horizontal.

18. The device of claim 6 wherein the steam outlet, the heated platen, the conveyor and the axis of rotation of the feeder coil are oriented at least generally vertically, with the steam outlet being located above the heated platen.

19. The method of claim 12 further comprising causing both the temperature and weight of the food item to increase from the injecting steam from the steam outlet in the face of the food item.

20. The method of claim 12 wherein the food item is toasted in about 13 seconds.

* * * * *